United States Patent [19]

Lindström

[11] Patent Number: 5,360,037

[45] Date of Patent: Nov. 1, 1994

[54] DIFFUSION-PROOF RUBBER HOSE HAVING PLASTIC MEMORY

[75] Inventor: Peter J. Lindström, Trelleborg, Sweden

[73] Assignee: Trelleborg Industri AB, Trelleborg, Sweden

[21] Appl. No.: 906,289

[22] Filed: Jun. 29, 1992

[30] Foreign Application Priority Data

Jun. 28, 1991 [SE] Sweden ............... 9102000-8

[51] Int. Cl.⁵ ............................................. F16L 11/08
[52] U.S. Cl. ................................. 138/138; 138/103; 138/137; 138/129; 138/140
[58] Field of Search ............... 138/103, 137, 138, 128, 138/151, 129, 132, 133, 134, 140, 141, 143, 144, 150, 151, 178, DIG. 8, 130

[56] References Cited

U.S. PATENT DOCUMENTS

| | | | |
|---|---|---|---|
| 591,092 | 10/1897 | Brooks | 138/DIG. 8 |
| 2,800,145 | 7/1957 | Peierls et al. | 138/125 |
| 3,175,586 | 3/1965 | Tatsch . | |
| 4,351,364 | 9/1982 | Cocks | 138/138 |
| 4,559,973 | 12/1985 | Hane et al. . | |
| 4,758,455 | 7/1988 | Campbell et al. | 138/128 |
| 5,052,444 | 10/1991 | Messerly et al. | 138/129 |

*Primary Examiner*—James E. Bryant, III
*Attorney, Agent, or Firm*—Beveridge, DeGrandi, Weilacher & Young

[57] ABSTRACT

A hose of elastomeric material has an insert of metal material for making the hose diffusion-proof. To impart plastic memory to the hose, i.e. make it plastically deformable, the insert according to the invention consists of at least two substantially completely overlapping metal foil layers of a ductile metal material which are fully glued and bonded to each other by means of a binder layer.

8 Claims, 1 Drawing Sheet

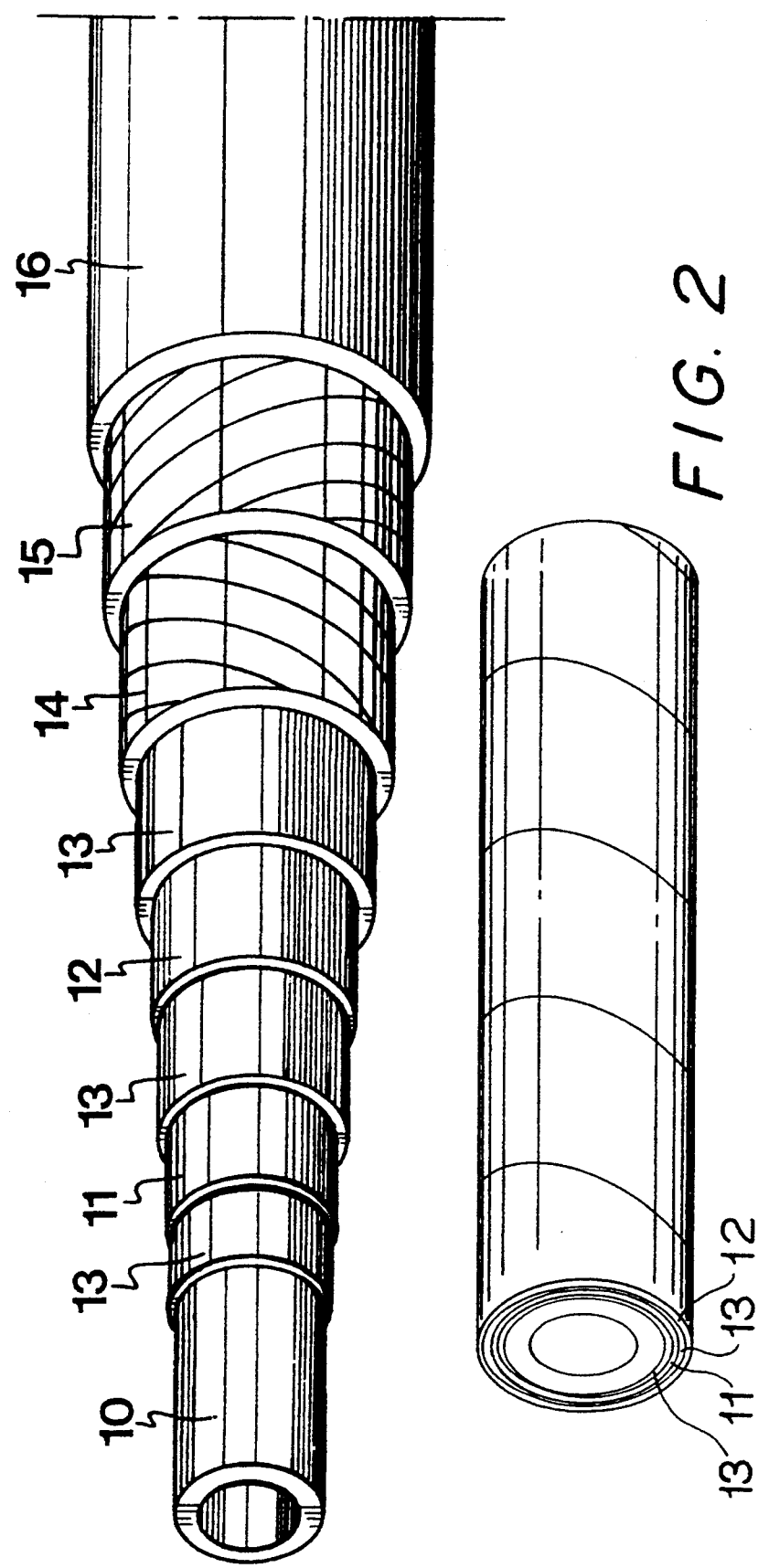

DIFFUSION-PROOF RUBBER HOSE HAVING PLASTIC MEMORY

BACKGROUND OF THE INVENTION

The present invention relates to a hose of elastomeric material having an insert of metal material for making the hose diffusion-proof. Hoses of this type are disclosed in e.g. U.S. Pat. Nos. 3,175,586 and 4,559,973. These hoses have inner and outer layers of elastomeric material which are sometimes reinforced. Between these inner and outer layers, a helically wound metal foil layer is disposed in such a manner that a slight overlap is obtained between adjoining convolutions of the metal foil strip. These prior-art hoses have been extensively used in cases where diffusion proofness is required. The known hoses are elastic and have a certain degree of resilience, which may be desirable in many cases. However, when these hoses are subjected to heavy bending, there is an obvious risk that the different metal foil layers may be pulled away from each other at the slightly overlapping joints.

In many applications, e.g. in the car industry, there is a widespread need of hoses having a stable, curved shape, sometimes with several bends of different orientation. In such cases, conventional hoses have hitherto been replaced by a plastically deformable metal tube, or the hose has been built on a mandrel having the desired geometry of curvature. Both these approaches are disadvantageous in different ways.

SUMMARY OF THE INVENTION

It is therefore an object of the invention to solve these problems and provide a diffusion-proof hose of rubber material having plastic memory.

According to the invention, this object is achieved by means of a hose which has an insert of metal foil material for making the hose diffusion-proof, and which is characterized by the features recited in appended claim 1. Particularly preferred embodiments of the invention are stated in the dependent claims.

Briefly, the invention thus resides in providing a hose of elastomeric material, i.e. rubber material, having an insert of metal material to make the hose diffusion-proof, the inventive concept being to impart plastic memory to the hose, i.e. make it plastically deformable, this being achieved according to the invention by means of an insert made up of at least two substantially completely overlapping metal foil layers comprising a ductile metal material and being fully glued and bonded to each other by means of a binder layer, such that the binder layer maintains the two metal foil layers spaced from each other.

EP-A-0,375,608 discloses a hose having inner and outer layers of thermoplastic material and optionally comprising a heat-insulating layer. This heat insulating layer may consist of different types of foam, e.g. of polyurethane, polyethylene and polyisocyanate as well as mineral and glass wool. As in the publications mentioned by way of introduction, use is made of metal strips or bands which are wrapped round the entire circumference of the layers located within, and which have overlap joints to ensure diffusion proofness. In one embodiment, the metal layers have been fully glued to each other to enhance diffusion proofness, which is especially desirable in the intended applications of the hose, namely for conveying liquids and/or gases having an essentially different temperature than the environment. The permeation of gases through thermoplastic materials is in fact highly dependent on the temperature difference over the plastic layer separating the two media. The invention according to this publication aims to solve the problem of diffusion proofness in a hose made of thermoplastic material, also in the case of substantial temperature differences between the inside and the outside of the hose, and is not concerned with the problem of providing plastic deformability in a hose of rubber or elastomeric material.

EP-A-0,111,169 also discloses a hose or a tube having an inner layer of extrudable plastic, a metal layer of a helically wound strip or band disposed thereon, and an outer layer of plastic. These layers are positively bonded to each other, although the joint abutments in one and the same layer can be glued or welded to each other. In other respects, this known hose is similar to the construction of EP-A-0,375,608.

EP-A-0,026,421 describes a plastic tube which has been provided with a metal foil or a metal coating, mostly a waved metal layer, on the inner tube to enhance diffusion proofness. In other respects, this plastic tube is similar to the hose or tube disclosed in EP-A-0,111,169.

BRIEF DESCRIPTION OF THE DRAWING

The invention will be described in more detail hereinbelow with reference to the the accompanying drawings, in which FIG. 1 schematically illustrates an embodiment of a hose according to the invention in a partially sectioned and peeled state.

FIG. 2 shows the helically wound foil layers of the hose.

DESCRIPTION OF THE PREFERRED EMBODIMENT

The hose according to the invention has an inner layer or lining 10 of elastomeric material, usually a suitable rubber material. This layer is surmounted by superposed metal layers 11, 12 of a ductile, malleable metal material, preferably aluminum or brass. In the illustrated embodiment, the hose has two such metal layers disposed on each other in a substantially completely overlapping relationship. Furthermore, the layers 11, 12 are glued to each other throughout their entire surfaces facing each other, by means of a binder layer 13. This layer may have been applied in advance on either or both of the metal layers and preferably consists of a heat-activated or heat-weldable binder, such as polyethylene. The binder layer may however also consist of a self-adhesive binder, such that the foil layers are joined to each other already in connection with the winding operation. Preferably, such a binder layer is applied on both sides of the metal layers.

In the illustrated embodiment, a number of additional layers are provided on the metal layers. Next to the metal layers 11, 12, there are two reinforcing plies 14, 15 embedded in elastomeric material and helically wound on each other in opposite winding directions. These plies may consist of conventional rubberized cord fabric. The outside of the hose consists of an outer rubber layer 16.

The fact that the hose according to the invention has at least two completely or substantially completely overlapping layers which are fully glued and bonded to each other throughout their entire surfaces facing each other, imparts plastic memory to the hose, i.e. makes it plastically deformable, despite the fact that the rubber material in the different hose layers strives to bring the hose back to the shape it had when manufactured. Without being committed to any particular theory, it is assumed that this plastic memory is achieved by the two metal foil layers being maintained at a certain distance from each other by means of the intermediate binder layer, such that the forces of deformation on the two layers are distributed in an advantageous manner, that is, the plastic metal flow in the outermost layer in a convex bend is substantially independent of the plastic metal flow in the innermost metal layer. The same favourable effect is achieved if the diffusion-proof layer is made up of three or more substantially completely overlapping layers which are interconnected by intermediate binder layers.

The following is an example of the manufacture of a currently preferred embodiment of the hose according to the invention.

On a straight metal mandrel having a diameter of 12.7 cm were first applied a release agent and on it an uncured rubber layer to form the inner rubber layer of the forthcoming hose. On the inner rubber layer was wound a 10-cm-wide strip of aluminum foil helically clockwise with a 5-cm overlap between the convolutions, such that the inner rubber layer was covered by two aluminum foil. As shown in FIG. 2, the foil is wound layers. The aluminum foil had a thickness of 15 $\mu m$ and was coated on both sides with a 20-$\mu m$-thick continuous layer of LD polyethylene. On the aluminum foil layers were wound two 25.4-cm-wide reinforcing plies of cord fabric. The innermost cord fabric ply was helically wound counterclockwise with edge to edge abutment between consecutive convolutions. The outermost reinforcing ply was helically wound clockwise with edge-to-edge abutment between consecutive convolutions. On the outer reinforcing ply was finally placed on outer layer of uncured rubber to form the outer rubber layer of the hose.

The mandrel with the different layers placed thereon was thereafter passed into a conventional hose curing apparatus and was cured for 60 min at 140° C. The result was a hose in which the two aluminum foil layers had been bonded to each other and to the surrounding rubber layers by means of the polyethylene material serving as binder. In bending tests, it was established that the resulting hose could be bent at a radius of curvature of 25 cm and, after bending, maintained this radius of curvature, as a result of a plastic deformation of the metal foil layers integrated in the hose.

The following rubber compound was used as rubber material for the inner and outer rubber layers:

| EPDM rubber | 100 parts by weight |
|---|---|
| FEF carbon black | 50 parts by weight |
| SRF carbon black | 150 parts by weight |
| MT carbon black | 200 parts by weight |
| Mineral oil | 130 parts by weight |
| Zinc oxide | 5 parts by weight |
| Stearic acid | 1 part by weight |
| Sulfur | 1.5 parts by weight |
| Tetramethylthiuram disulfide | 1.5 parts by weight |
| Mercaptobenzothiazole | 0.5 parts by weight |

It is understood that other rubber compounds or compounds of elastomeric materials can be used, and that the composition of the inner and outer rubber layers is primarily dependent on the environment in which the finished hose is to be used. Those of average skill in the art have sufficient competence to elect a suitable rubber or elastomeric material for each specific application of the hose.

A man skilled in the art will also be able to modify the plastic deformability of the hose by using other thicknesses of the inner and outer rubber layers and of the metal foil, and by otherwise disposing the reinforcing layers, or by using reinforcing layers of other designs. For example, it is possible to use a braided reinforcement inside or outside the metal foil layers and also to use more than two metal foil layers.

In this Example, the inner and outer rubber layers can be applied in a hose making machine in which the coated metal foil layers and also the reinforcing layers are wound, thus enabling continuous manufacture. Within the scope of the invention, hose lengths may however be built manually or semi-mechanically on a mandrel, the different layers being wound on the mandrel in the intended order. In this case, the metal foil layers need not be disposed as a helically wound strip, but may be applied by wrapping a foil sheet in two or more full convolutions around the inner layer or layers already wound on the mandrel.

What I claim and desire to secure by letters patent is:

1. A plastically deformable hose made from elastomeric material and having a plurality of layers, comprising, an inner insert of metal material for making the hose diffusion-proof, said insert of metal material including at least two substantially completely overlapping metal foil layers which make the hose plastically deformable so as to have a plastic memory, each of said metal foil layers being formed of a ductile metal material, and a polyethylene binder layer bonding said foil layers to each other.

2. Hose as claimed in claim 1, wherein the insert of metal foil layers is also bonded to adjacent layers of the hose.

3. Hose as claimed in claim 1, wherein the metal foil layers are wound with substantially full overlap.

4. Hose as claimed in claim 1, wherein the metal foil layers are helically wound.

5. Hose as claimed in claim 1, wherein the insert of metal foil layers is bonded to the surrounding layers of the hose by means of a heat-weldable or heat-activated binder.

6. Hose as claimed in claim 1, wherein the insert of metal foil layers is disposed between an inner hose layer of elastomeric material and an outer reinforced hose layer of elastomeric material.

7. Hose as claimed in claim 1, wherein the metal layers comprise a plastically deformable metal material chemically compatible with the surrounding elastomeric layers or provided with a protective layer.

8. Hose as claimed in claim 7, wherein the metal foil layers are selected from the group consisting of aluminum, aluminum alloys, and brass alloys.

* * * * *